(12) United States Patent
Borras

(10) Patent No.: US 10,448,580 B1
(45) Date of Patent: Oct. 22, 2019

(54) LANDSCAPE BORDER

(71) Applicant: Orlando Borras, Haines City, FL (US)

(72) Inventor: Orlando Borras, Haines City, FL (US)

( * ) Notice: Subject to any disclaimer, the term of this patent is extended or adjusted under 35 U.S.C. 154(b) by 0 days.

(21) Appl. No.: 15/988,040

(22) Filed: May 24, 2018

Related U.S. Application Data

(63) Continuation-in-part of application No. 15/785,636, filed on Oct. 17, 2017, now Pat. No. 10,064,348.

(51) Int. Cl.
*A01G 9/28* (2018.01)

(52) U.S. Cl.
CPC ..................... *A01G 9/28* (2018.02)

(58) Field of Classification Search
None
See application file for complete search history.

(56) References Cited

U.S. PATENT DOCUMENTS

| | | | |
|---|---|---|---|
| 3,485,449 A | 12/1969 | Wilson | |
| 3,788,001 A * | 1/1974 | Balfanz, Jr. | A01G 9/28 47/33 |
| 4,074,479 A * | 2/1978 | Krupka | A01G 9/28 52/102 |
| 4,185,429 A * | 1/1980 | Mendola | E02D 31/02 52/169.5 |
| 4,372,079 A | 2/1983 | Trageser | |
| 4,698,135 A * | 10/1987 | Raab | A01G 25/00 202/234 |
| 4,702,034 A | 10/1987 | Ferguson et al. | |
| 4,831,776 A * | 5/1989 | Fritch | A01G 9/28 47/33 |
| 4,863,307 A * | 9/1989 | Jones | E01C 11/221 404/7 |
| 4,897,973 A * | 2/1990 | Foster, Jr. | E02D 31/06 404/7 |
| 4,945,675 A * | 8/1990 | Kendrick | F21V 21/0824 47/33 |
| 5,067,273 A | 11/1991 | Richwine | |
| 5,073,061 A * | 12/1991 | Jones | E01C 11/221 404/7 |
| 5,157,867 A * | 10/1992 | Fritch | A01G 9/28 47/33 |
| 5,232,159 A | 8/1993 | Abbate, Sr. et al. | |
| 5,240,343 A * | 8/1993 | Strobl, Jr. | E01C 11/221 404/7 |
| 5,377,447 A | 1/1995 | Fritch | |

(Continued)

FOREIGN PATENT DOCUMENTS

| | | | |
|---|---|---|---|
| DE | 3804120 A1 * | 8/1989 | A01G 13/105 |
| EP | 1414124 | 10/2003 | |
| WO | 03069976 | 8/2003 | |

*Primary Examiner* — Brian E Glessner
*Assistant Examiner* — Adam G Barlow
(74) *Attorney, Agent, or Firm* — Hanrahan Law Firm, P.A.; Benjamin M. Hanrahan

(57) ABSTRACT

A landscape border system and assembly is presented herein. In particular, the system is installed within a landscape to create a border therein or there about. The border includes a body defined by at least one structural wall, a top wall and at least one anchor ledge extending from the structural wall. The anchor ledge includes a plurality of holes through which grass roots can grow to anchor the device to or within the ground. Additional features include a channel disposed along an outer exposed side of the top wall of the body for receiving an herbicide or other chemical.

16 Claims, 21 Drawing Sheets

(56) References Cited

U.S. PATENT DOCUMENTS

| | | | | |
|---|---|---|---|---|
| 5,421,118 A * | 6/1995 | Bauer | | A01G 9/28 47/33 |
| 5,501,044 A * | 3/1996 | Janesky | | E04B 1/7023 404/4 |
| 5,605,416 A * | 2/1997 | Roach | | E02B 3/02 405/21 |
| 5,746,375 A * | 5/1998 | Guo | | B05B 15/622 239/245 |
| 5,921,021 A | 7/1999 | Coates | | |
| 5,926,999 A * | 7/1999 | Vernon | | A01G 13/105 43/121 |
| 5,930,947 A * | 8/1999 | Eckhoff | | E02D 29/0225 47/33 |
| 6,038,811 A | 3/2000 | Conway | | |
| 6,099,201 A * | 8/2000 | Abbrancati | | A01G 9/28 404/7 |
| 6,138,405 A | 10/2000 | Matz | | |
| 6,173,906 B1 | 1/2001 | Von Kerens | | |
| 6,195,956 B1 * | 3/2001 | Reyneveld | | B28B 7/0017 264/163 |
| 6,237,293 B1 * | 5/2001 | Gembala | | E04D 13/0431 52/302.6 |
| D448,498 S * | 9/2001 | Hulett | | D25/164 |
| D455,504 S * | 4/2002 | Foster | | D25/164 |
| D463,868 S * | 10/2002 | Foster | | D25/164 |
| D464,149 S * | 10/2002 | Risi | | D25/113 |
| 6,502,349 B1 | 1/2003 | Richet et al. | | |
| 6,598,360 B1 * | 7/2003 | Pratt | | E02D 31/02 52/169.5 |
| 6,616,383 B2 * | 9/2003 | Janz | | E02B 3/04 405/21 |
| 6,619,001 B1 * | 9/2003 | Pratt | | E02D 31/02 52/169.5 |
| 6,625,925 B1 * | 9/2003 | Foster | | A01G 9/28 47/33 |
| 6,767,159 B2 * | 7/2004 | Jones | | A01G 9/28 404/7 |
| 6,896,445 B1 * | 5/2005 | Engler | | E02B 3/046 405/25 |
| 6,925,753 B1 | 8/2005 | Mallory | | |
| 7,051,477 B2 * | 5/2006 | Burnham | | A01G 9/28 47/33 |
| 7,380,374 B1 * | 6/2008 | Pratt | | E02D 31/02 405/43 |
| 7,963,718 B2 * | 6/2011 | Zwier | | E01C 11/221 404/7 |
| 8,186,127 B1 * | 5/2012 | Pratt | | E02D 31/02 52/169.5 |
| 9,173,350 B1 | 11/2015 | Beutler | | |
| 9,206,560 B2 * | 12/2015 | Alfieri, III | | E01O 5/005 |
| 9,206,561 B2 * | 12/2015 | Alfieri, III | | E01C 11/221 |
| 2001/0029709 A1 * | 10/2001 | Anderson | | E02D 29/0233 52/102 |
| 2002/0078636 A1 * | 6/2002 | Whitson | | A01G 9/28 52/102 |
| 2002/0121052 A1 * | 9/2002 | Olink | | A01G 9/28 52/102 |
| 2003/0089031 A1 | 5/2003 | Wong et al. | | |
| 2003/0163955 A1 * | 9/2003 | Harris | | A01G 9/28 47/33 |
| 2005/0081437 A1 * | 4/2005 | Heinemann | | A01G 9/28 47/33 |
| 2005/0183373 A1 * | 8/2005 | Mansour | | E04B 5/046 52/596 |
| 2006/0043256 A1 * | 3/2006 | Bogrett | | A01G 9/28 249/2 |
| 2007/0193112 A1 * | 8/2007 | Olink | | A01G 9/28 47/33 |
| 2009/0223121 A1 * | 9/2009 | Jones | | A01G 9/28 47/33 |
| 2013/0025194 A1 | 1/2013 | Adam | | |

* cited by examiner

LANDSCAPE BORDER

CLAIM OF PRIORITY/CROSS REFERENCE TO RELATED APPLICATIONS

The present application is a continuation-in-part patent application of previously-filed, currently-pending U.S. patent application Ser. No. 15/785,636 filed on Oct. 17, 2017, the contents of which are incorporated herein in their entirety by reference.

FIELD OF THE INVENTION

The present invention is generally directed to a device or apparatus that can be installed or otherwise disposed substantially in or underground and which can define a border in a landscape setting. For example, in some embodiments, the device or apparatus may be installed about an outer edge of a lawn or other landscape section, e.g., along a sidewalk, walkway, driveway, flowerbed, trees, post, house, building, etc. Although in some cases, the device may be installed in a position within the lawn such that the lawn completely surrounds the device.

In particular, the device can include an exposed top surface that provides a clean, generally smooth or at least partially flat surface and, in some embodiments, a channel along the top surface. One or more sprinklers, lights, or other modules may be selectively installed or inserted within certain embodiments of the border system, for example, in locations chosen on-site by the user or installer.

BACKGROUND OF THE INVENTION

Landscaping, particularly in the context of residential and commercial landscaping, can be referred to as the collection of various aesthetic items that form an area of land. This can include grass, sod, or lawn, as well as tress, bushes, flowers, and other flora or fauna, for example. Oftentimes, various lights and sprinklers are positioned throughout the land or yard in order to provide aesthetic appeal, particularly in the case of lighting, or for maintaining the landscape, such as in the case of sprinklers. The sprinklers can, in many cases, be substantially underground such that certain sprinkler heads will pop up at different times to provide water to the yard or landscape.

Additional maintenance of the landscape or lawn often requires the use of machinery or tools such as a lawn mower, edger, and in some cases a weed whacker or weed trimmer. For example, lawn mowers often cannot cut or trim grass near the edges of the landscape, for example, the grass adjacent a sidewalk, pavement, walkway, driveway, patio, fence, etc. This is mainly because the blade of a lawn mower is contained in the center-bottom portion of the mower, with the wheels disposed on the outer periphery. Thus, in order to trim or cut the grass or lawn around the edges, such as around or adjacent walkways, pavement, patios, fences, etc., additional tools such as an edger or weed trimmer may be needed.

There is thus a need in the art for a landscape bordering system that can be disposed or installed around the borders of residential and commercial landscapes, particularly around the borders of a lawn, and which can be aesthetically pleasing and can provide a clean border there about. The proposed border, in some cases, may allow a lawn mower to drive or roll there upon, thereby exposing the grass at the edges to the blade of the lawn mower. This can eliminate or at least reduce the need for additional equipment, such as edgers and weed trimmers, commonly used to trim the edges or borders of residential and commercial landscaping.

In addition, the proposed bordering system could provide a mounting assembly on an interior thereof, allowing for the selective installation of additional modules, including, but in no way limited to sprinklers, electrical lights, solar lights, etc. In some embodiments, the mounting assembly can span continuously along the border system, allowing the user to choose if and/or where to install the additional modules, as desired.

SUMMARY OF THE INVENTION

Accordingly, at least one embodiment of the present invention is directed to a landscape border, device or insert that can be selectively installed in a landscape setting to create or define a border. For instance, the device of the present invention can define a border around the outer edges of a lawn, for example, between the grass and an adjacent sidewalk, walkway, paver, pavement, driveway, patio, fence, etc., or within the confines of the law, for example, in the case of a free-standing sprinkler, light or other installation not around the periphery of the lawn. In other embodiments or cases, the device of the present invention can be installed around or adjacent posts, poles, sprinkler heads, for example, either around the edges or outer border of the landscape or within the interior of the landscape or lawn. For instance, the system or device of at least one embodiment of the present invention includes a body defining a substantially or at least partially flat top surface and an interior portion.

In some embodiments, a mounting assembly may be disposed on the interior of the body allowing for additional modules, such as sprinklers, lights, etc. to be installed therein. In some cases, the mounting assembly includes two parallel and longitudinal rails that extend substantially or entirely along the length of the interior portion of the body. This allows the module(s) to be installed virtually anywhere along the length of the device, as selected by the user and/or as dictated by the particular situation or environment.

Additional features of some embodiments may include an herbicidal or other channel disposed at least partially along an outer exposed side of the top surface or top wall of the body. The channel may be disposed substantially proximate to a front edge of the top surface or top wall (e.g., adjacent to the edge of the grass or lawn). In this manner, a user may decide to spray, pour, or dispense an amount of herbicide or other chemical into the channel along the length of the border. This can help eliminate or restrict the growth of weeds, grass, etc. over the top of the border and can therefore help maintain a clean edge of grass along the border.

These and other objects, features and advantages of the present invention will become more apparent when the drawings as well as the detailed description are taken into consideration.

BRIEF DESCRIPTION OF THE DRAWINGS

Like reference numerals refer to like parts throughout the several views of the drawings provided herein.

DETAILED DESCRIPTION OF THE INVENTION

Figure 1:
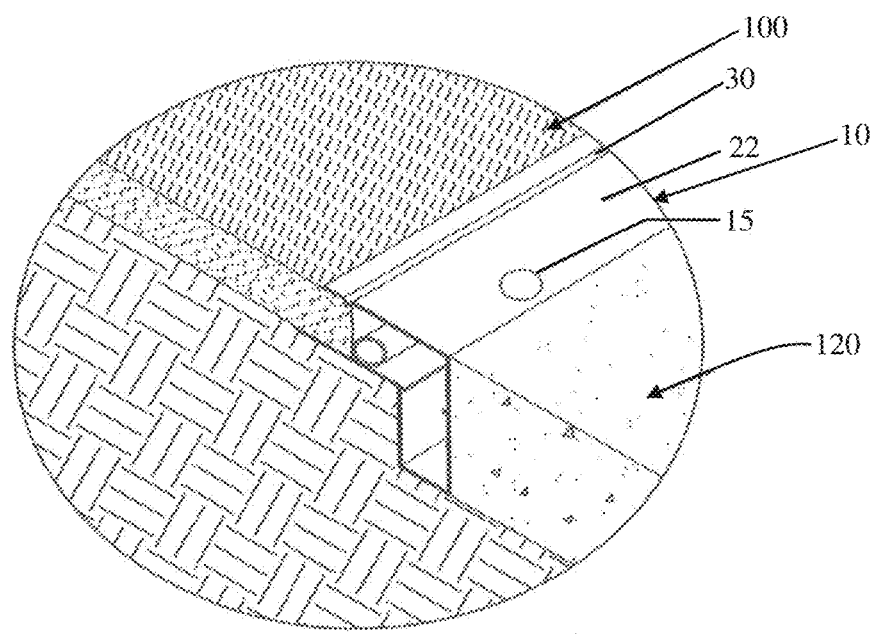
FIG. 1 is a partial sectional view of the landscape bordering system installed between a lawn and concrete barrier as disclosed in accordance with at least one embodiment of the present invention.
Figure 2:
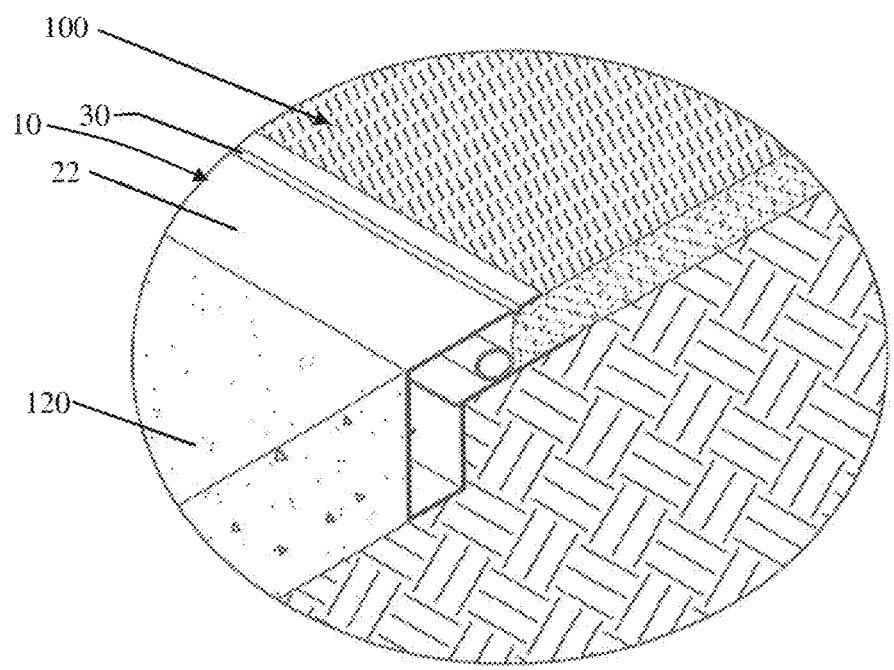
FIG. 2 is another partial sectional view of the landscape bordering system installed between a lawn and concrete barrier as disclosed in accordance with at least one embodiment of the present invention.

As shown in the accompanying drawings, and with particular reference to FIGS. 1 and 2, for example, at least one embodiment of the present invention is directed to a landscape bordering system, device or insert, referenced as 10. In particular, the landscape bordering system, device or insert 10 of the present invention includes a body 20 that is at least partially submerged or buried under ground and which provides a border in various landscaping designs. The border may be defined as the outer peripheral edges of a lawn (e.g., between the lawn and an adjacent concrete slab, sidewalk, driveway, patio, house, building, flower bed, bush or shrub area, etc., or in the case of a free-standing border device of the present invention, as described herein, the border can be defined as being within the confines of the lawn, for example, about an auxiliary module such as a sprinkler, light, etc.

For instance, as shown in FIGS. 1 and 2, the system or device 10 of at least one embodiment of the present invention can be positioned between grass or sod, represented as 100 and an adjacent surface, generally represented as 120. As an example, the adjacent surface 120 may be concrete, pavement or bricks, and may represent or otherwise form a sidewalk, walkway, driveway, patio, etc. It should be noted that the bordering system and/or device 10 of the present invention can also be placed between other various portions of a landscape, such as, but not limited to, around or adjacent trees, bushes, flowerbeds, plants, planters, fences, posts, poles, sprinkler heads, etc. In this manner, the device 10 of the present invention may be disposed between mulch, wood chips, dirt, sand, concrete, brick, pavement, a house, building, etc., as desired or as the particular site or location warrants.

Figure 3:
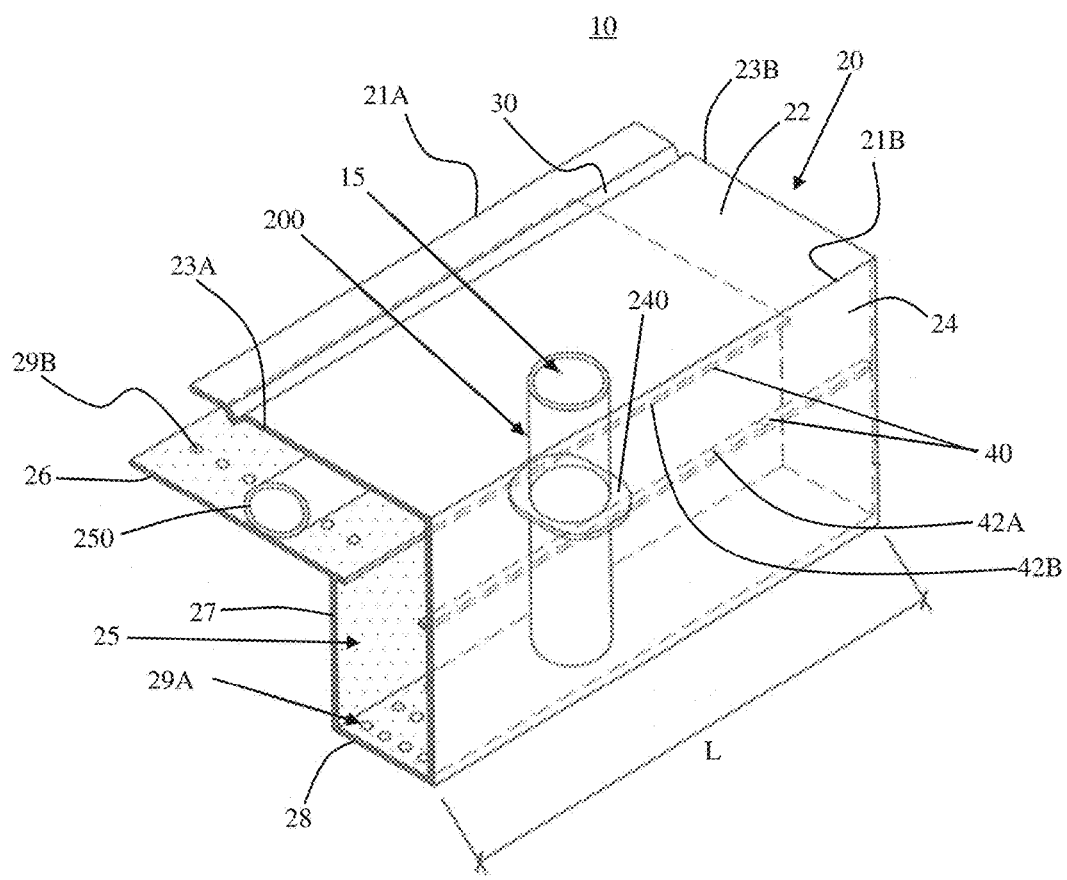
FIG. 3 is a rear perspective view of the landscape bordering system as disclosed in accordance with at least one embodiment of the present invention.

In any event, as will be described herein, the bordering system or device 10 of the present invention provides a clean, attractive border at the edge of a landscape, between two portions of a landscape, or within the landscape, and, in some embodiments, can house one or more modules, such as sprinklers, hoses, water pipes, lights, electrical cables, wires, etc. Accordingly, with reference to FIG. 3, the device 10 of at least one embodiment includes a body 20 with a top surface or wall 22, a rear or back surface or wall 24, and one or more bottom surfaces or walls 26, 28. One or more upward or connecting walls or surfaces 27 may also be included, as shown in FIG. 3, for example. In this manner, the body 20 includes or otherwise defines an interior portion 25 via the various walls or surfaces 22, 24, 26, 27, 28, as shown in FIG. 3.

It should also be noted that in some embodiments, at least a portion of the interior 25 may be exposed or, in other words, as shown in FIG. 3, for example, the interior portion 25 may be at least partially open or otherwise not completely closed. For example, in the embodiment illustrated, the front end of the device 10 between the top surface 22 and one of the bottom surfaces 26 is open or at least partially open. As will be described herein, this can allow grass, sod, dirt, rocks, sand or other materials to packed into the front of the device 10, which in many cases can help anchor the device 10 down and remain in place.

In addition, the section illustrated in FIG. 3 is exemplary in nature in that the device can include a length, represented by L, of various sizes, for example, up to 12 feet. Other lengths, whether greater or less than 12 feet are contemplated within the scope of the present invention. In some embodiments, the device 10, and in particular the length of the device 10 can be cut or trimmed on-site or off-site in order to accommodate different situations and locations. In particular, the device 10 may be constructed of a material which can be cut with a saw, knife or other sharp instrument in order to facilitate custom installations for different dimensions or situations. For example, the device 10, and in particular the walls thereof, can be constructed of a plastic material, metal or metallic materials, PVC, etc.

Furthermore, still referring to FIGS. 1, 2 and 3, the top surface or top wall 22 of at least one embodiment of the present invention includes a front edge 21A that is positioned along grass, sod, or other adjacent surface, for example. Back edge 21B, disposed substantially parallel to the front edges 21A, can terminate at the back wall 24, as shown. With reference to FIGS. 1 and 2, the back wall 24 can be positioned adjacent or against another surface, such as concrete, pavement, bricks, etc.

As shown, the device 10 is disposed mostly underground, with the top surface 22 exposed. In this manner, the back wall 24, and bottom walls 26, 28 are substantially or entirely underground, while the top surface 22 is at least partially exposed above ground. It is the top surface 22 that provides a clean, visually attractive border between the adjacent surfaces or materials, such as between the lawn 100 and an adjacent pavement. In this regard, the top surface 22 of at least one embodiment may include a substantially or at least partially flat or smooth surface, although some embodiments include a channel 30 and/or one or more installed modules 200, as will be described herein. It should also be noted that the top surface 22 may include other decorative effects such as having a textured surface, if desired.

Still referring to FIGS. 1 and 2, for instance, the top surface 22 may be substantially flat or even with the ground, or in some cases, may be just above ground level. The substantially flat top surface 22 allows a lawn mower to be simply driven over the top surface 22, thereby cutting the edge of the grass or lawn 100. For example, the wheels of a lawn mower can be passed over the top surface 22 of the device 10 while the blade of the lawn mower is able to cut the grass or lawn on the immediate edge of the device 10. Advantageously, this can significantly reduce the amount of time it takes to cut the lawn in that additional equipment, such as an edger or weed whacker, may not be needed.

Additionally, in some embodiments, a small or thin channel 30 may run along at least a portion of the top surface 22, such as along or upon an outer exposed side of the top surface 22. The channel 30 can prevent or restrict the growth of plants, grass, weeds, or other foliage over the top of the top surface 22. In particular, a user or individual may spray, sprinkle, or otherwise distribute an amount of herbicide, weed killer(s), chemical(s), etc., whether liquid, gel, solid, granules, or otherwise, into the channel 30. In this manner, the herbicide or other chemical, for example, can be retained at least temporarily within the channel 30 to prevent or restrict the growth of grass, weeds, or other foliage there upon.

In at least one embodiment, the channel 30 is disposed proximate to and substantially parallel to the front edge 21A of the top surface 22, as illustrated, for example, in FIG. 3. Furthermore, in some embodiments, the channel 30 may extended entirely or otherwise continuously along the top surface 22, for example, in a longitudinal manner, between oppositely disposed side edges 23A, 23B. It should also be noted that in some implementations, the channel 30 may include a "v" shaped configuration such that the bottom of the channel defines a point or apex, however, other shapes and sizes of the channel 30 are contemplated within the full spirit and scope of the various embodiments presented herein.

Accordingly, it should also be noted that the channel 30 may be used as a guide for one or more weed or grass trimming tools, including but not limited to a weed trimmer or weed whacker, roller, scissors, etc. In this manner, a tool may be run along or within the channel 30 in order to cut or trim any grass that may have grown over the top surface of the device or insert 10.

Further features of at least one embodiment of the present invention include the ability to selectively install one or more modules 200 (such as, but not limited to sprinklers, lights, solar lights, etc.) within the device 10. Specifically, the device 10 of at least one embodiment may further include a mounting assembly 40 disposed within the interior portion 25 thereof. A module 200 with corresponding mounting component(s) 240 can be installed through the top surface 22 (e.g., through a hole or opening created in the top surface 22) and into an engagement with the mounting assembly 40.

For instance, the mounting assembly 40 may be constructed such that only modules 200 comprising a corresponding or proprietary mounting component(s) 240 can be used in connection with the device 10 of the present invention. In this regard, modules 200 may be separately purchased or otherwise selectively installed, as desired, or otherwise as necessary in accordance with the particular application or situation.

In any event, in some embodiments, the mounting assembly 40 may span substantially or entirely along the interior portion 25 of the device 10, for example, longitudinally between opposite ends 23A, 23B. This allows the one or more modules 200 to be installed virtually anywhere along the top surface 22 between the edges 23A, 23B, so long as it is in alignment with the mounting assembly 40. For instance, in at least one embodiment, a user may create a hole or opening (represented as 15) along the top surface 22 where he or she wants to install a module 200 (such as a sprinkler, light, etc.) This hole 15 can be drilled, cut, or punched out, for example, on site by the user or off site. With the hole or opening made, the module 200 can be inserted into the device 10, extending at least partially into the interior portion 25 thereof, and into engagement with the mounting assembly 40. In some cases, additional connections may need to be made, such as, connection with a water pipe or electrical wires that may also be located within the interior portion 25.

For example, with reference to FIG. 3, the mounting assembly 40 may include at least one rail 42A, 42B extending longitudinally along the interior 25 of the device 10. One of the rails 42A may extend off of the back wall 24 and another rail 42B may be substantially parallel to first rail 42A defining a space there between. The module 200, such as the sprinkler or light, may include a corresponding mounting component 240, such as a platform or engaging wings that extend from the module 200 and is configured to engage with the mounting assembly 40. In particular, and still referring to FIG. 3, in at least one exemplary embodiment, the mounting component 240 may comprises a platform or protrusions that flare out on opposite sides of the module 200. This allows the module 200 to be inserted into the interior portion 25 (for example, through the hole 15 created or drilled on-site), and once the protrusions clear or pass beyond the longitudinal rails 42A, 42B, the module 200 can be twisted or rotated, for example, 90 degrees, such that the protrusions or platforms align under the rails 42A, 42B. Thus, if the module 200 were to be lifted upwards, the engagement between the rails 42A, 42B and the platform of the module 200 would prevent or restrict the upward movement of the module 200.

It should be noted that other mounting assemblies 40 disposed within the device 10 and corresponding mounting components 240 contained on the module(s) 200 are contemplated within the full spirit and scope of the present invention.

Furthermore, in at least one embodiment, the interior portion 25 of the present invention is defined by or otherwise includes a lower extended portion 25A and an intermediate portion 25B. The lower extended portion 25A extends downward near or adjacent the back wall 24, and in some cases, is defined by at least a portion of the back wall 24, a bottom surface 28, and an upward or connecting wall 27. In some embodiments, the lower portion 25A is at least partially below the mounting assembly 40 and includes a plurality of drainage holes 29A. The drainage holes 29A allow fluids, such as water, to drain there through and into the surrounding ground surface.

Moreover, the intermediate portion 25B of the interior 25 may be defined by an intermediate bottom surface 26 and at least a portion of the top surface 22. As mentioned herein, in some embodiments, the front of the device 10 may be open or at least partially open, as shown in the drawings. This allows dirt, rocks, sand, or grass, for example, to be disposed at least partially into the intermediate portion 25B, which can help anchor the device 10 to the ground, as shown in FIGS. 1 and 2, for example. The intermediate portion 25B may also include a plurality of holes 29B, for example, on the bottom surface 26 thereof. These holes 29B can be used for drainage purposes, as well, however, in other embodiments, grass roots or other plant roots may grow through the holes 29B in the intermediate portion. This can be used to even further facilitate anchoring of the device to the ground. For instance, since the device 10 is placed against or adjacent grass or lawn, the holes disposed in the intermediate portion 25B near the front of the device may facilitate the grass or lawn adjacent the front edge to grow roots there through.

In addition, with reference to FIGS. 1, 2, and 3, one or more pipes 250, such as water or other fluid pipes may be disposed longitudinally within the interior portion 25 of the device 10. Although the drawings show pipes 250 disposed in the intermediate portion 25B, other locations within the device 10 are contemplated. In any event, the pipe(s) 250 may be used to connect one or more sprinklers or other modules 200 thereto. For example, with reference to FIG. 4B, the sprinkler(s) 200 may include a bracket such as a t-bracket, that allows each of the sprinklers to fluidically interconnect to the water supply pipe 250. In other embodiments, electrical wires, data wires, etc. may be disposed within the interior portion 25 of the device 10, for example, to supply power to or otherwise connect to other modules 200 such as lights.

Figure 4A:
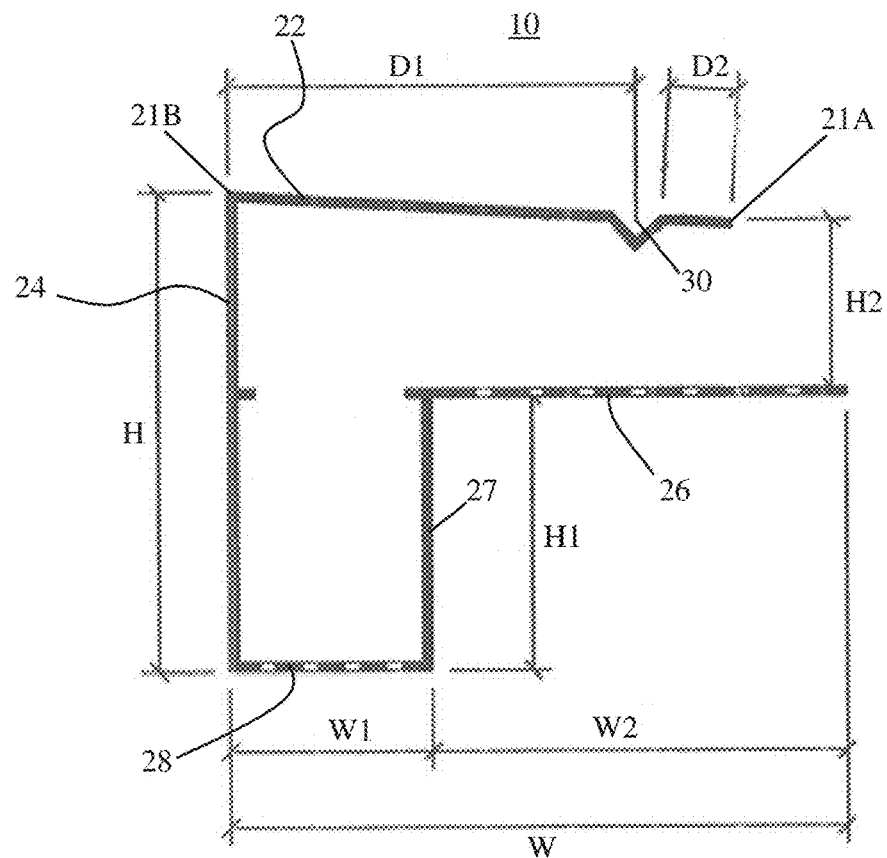
FIG. 4A is a side cross sectional view of the landscape bordering system as disclosed in accordance with at least one embodiment of the present invention.
Figure 4B:
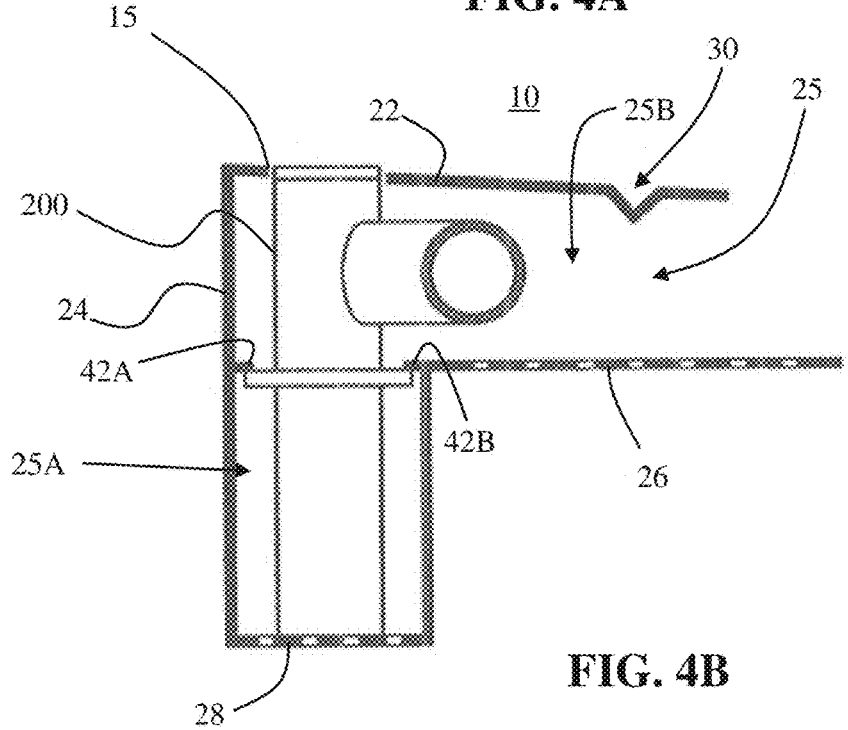
FIG. 4B is another side cross sectional view of the landscape bordering system as disclosed in accordance with at least one embodiment with a sprinkler head and t-bracket installed therein.

With reference to the side cross sectional views illustrated in the drawings, e.g., FIGS. 4A and 4B, additional structural features are shown or otherwise apparent. For instance, in some embodiments, the top surface 22 may taper slightly downward from the back surface 24 or back edge 21B to the front edge 21A. In this regard, the top surface 22 may not be completely level, at least in the resting orientation, but may instead slope slightly downward, as shown. With grass, dirt, or other items disposed between the top surface 22 and the intermediate bottom surface 26, for example at the end or proximate edge 21A, the top surface 22 may bend or flex upward, although in some embodiments or implementations is may not.

Furthermore, as also shown in the cross-sectional views, such as FIGS. 4A and 4B, the intermediate bottom surface 26 of at least one embodiment may extend further outward than the top surface 22. In this regard, the end or outer edge of the intermediate bottom surface 26 may be extended further outward than the outer edge 21A of the top surface 22. This provides a surface 26 in which the grass or sod can grow in a manner such that the roots of the grass may extend through the intermediate bottom surface 26, for example, through holes 29B. This can help secure or anchor the device 10 to the ground and in place.

In addition, the front edge 21A of the top surface 22 may, in some cases, be slightly bent or angled (not shown) upward relative to the substantially or at least partially flat top surface 22. For instance, the section of the top surface between the channel 30 and the edge 21A may be bent or angled slightly upward, although in some embodiments, the angled portion may begin at or on the other side of the channel 30 (wherein the channel is on the portion of the top surface 22 that is slightly angled upward. This slight upward angle of the front edge 21A or portion of the top surface 22 adjacent the front edge 21A can facilitate the growth of grass beneath the top surface 22 to be angled outward toward the opening. For instance, grass may grow beneath the top surface 22 and extend roots through holes 29B. The top surface 22, and in some embodiment, the slightly bent or angles edge 21A (not shown) of some embodiments may force the grass to grow at an angle stating at the holes 29B and angled outward toward the opening or outer edge 21A. This keeps the grass off of the top surface 22, such as the outer exposed side of the top surface 22, and also allows a lawn mower to easily cut the grass as it passes over the border device 10.

Moreover, still referring to FIG. 4A, the width W, measured from the back surface 24 to the outer end of the intermediate bottom surface 26 may be approximately four and a half inches, wherein the width of the intermediate bottom surface W2 is approximately three inches, and the width of the lower bottom surface 28 is approximately one and a half inches. Along these lines, the width of the top surface 22 referenced as D1 and D2, may be approximately three and a half inches, wherein D1 is about three inches and D2 is about one-half inches. In this manner, the intermediate bottom surface 26 may extend about an inch beyond the outer or front edge 21A of the top surface.

Still referring to FIG. 4A, the height H of at least one embodiment measured along the back surface 24 may be approximately three and a half inches. Also, the height of the connecting surface 27 may be about two inches and the opening between the end 21A of the top surface 22 and the intermediate bottom surface 26, referenced as H2, may be about one and one-quarter inches. In this manner, the taper or downward slope of the top surface 22 from the back edge 21B to the outer or front edge 21A may be approximately one-quarter of an inch.

It should be noted, however, that these dimensions and measurements are provided as exemplary only and should not be considered limiting in any manner as other dimensions and measurements may be implemented within the full spirit and scope of the present invention.

Figure 5A:
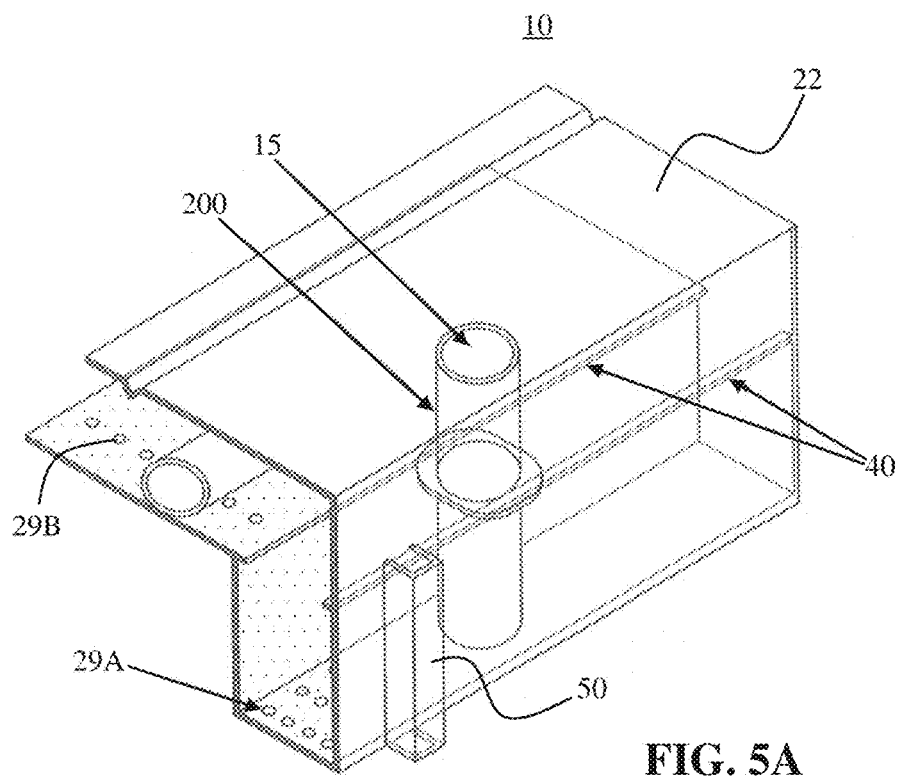
FIG. 5A is a rear perspective view of the landscape bordering system as disclosed in accordance with another embodiment of the present invention.
Figure 5B:
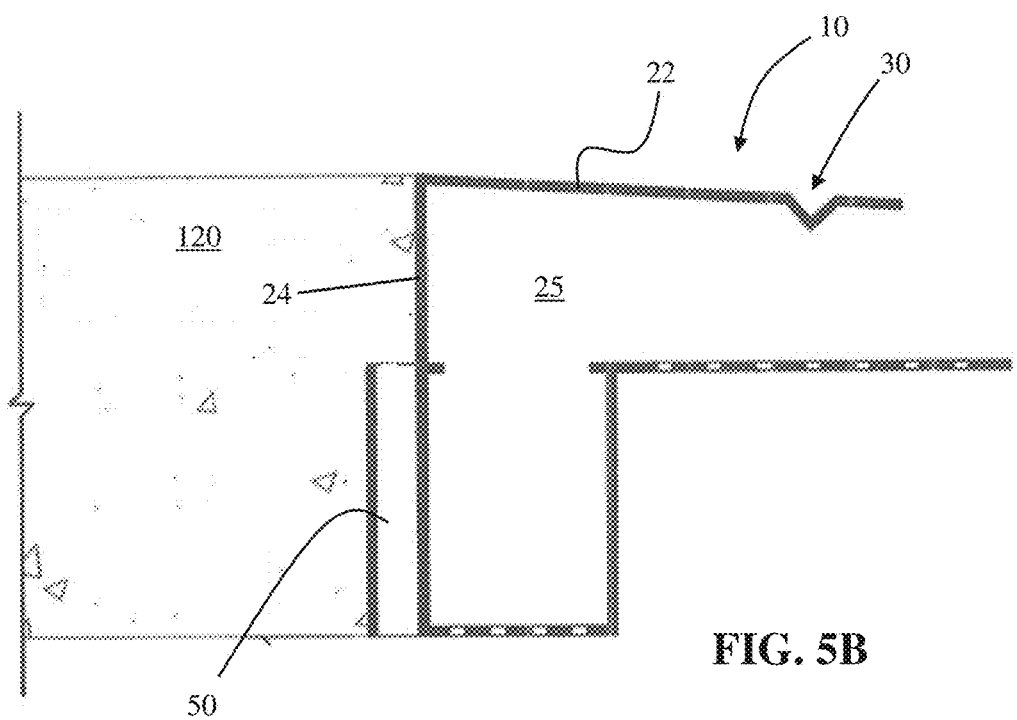
FIG. 5B is a side cross sectional view of the landscape bordering system illustrated in FIG. 5A with a concrete border illustrated.

FIGS. 5A and 5B illustrated yet another feature of some embodiments of the present invention. For example, an anchoring channel 50 may be included on the exterior of the device 10. In the embodiment shown, the anchoring channel 50 is vertically disposed along the exterior of back wall 24, however, other locations are contemplated. In any event, the anchoring channel 50 includes an opening through which a spike or other anchor (not shown) can be disposed. The spike or other anchor may be inserted through the anchoring channel 50 and into the surrounding ground in order to secure or anchor the device. In the case where the device 10 abuts against concrete, such as, for example, a walkway, sidewalk, driveway, patio, etc., the spike or anchor may be inserted through the anchoring channel 50 prior to poring the concrete or pavement or prior to installing bricks, for example.

In addition, two bordering devices 10 of the present invention can be used to frame or form a sidewalk, walkway, driveway, etc. prior to pouring the concrete, for example. In particular, many concrete sidewalks, walkways, etc. are "formed" by placing wood siding along the edges of where the sidewalk will be defined. The wood siding acts as an outer frame within which the concrete is poured in order to construct the walkway. In some cases, two or more landscape bordering devices 10 of the present invention can be used in place of, or instead of the wood siding in order to form or frame the sidewalk or walkway. Particularly, with reference to FIG. 5B, the back surface 24 can function as a siding for the walkway or driveway, for example, where the concrete 120 is poured. Another parallel device 10 can be positioned on the other side (not shown) defining an area between the back surfaces 24 of parallel devices 10 within which the concrete can be poured. In addition, as provided above, anchoring channel 50 may be used to stake or anchor the device(s) down, thereby forming the sidewalk, walkway, etc. prior to pouring the concrete.

Figure 6A:
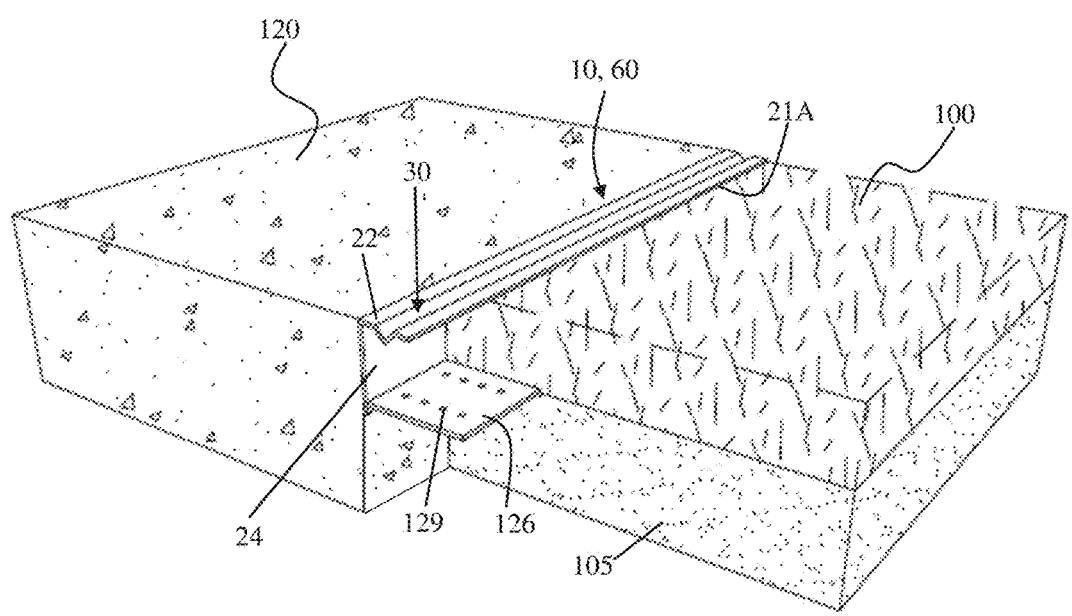
FIG. 6A is a partial cut-away perspective view of the landscape border device as disclosed in accordance with at least one embodiment of the present invention.
Figure 6B:
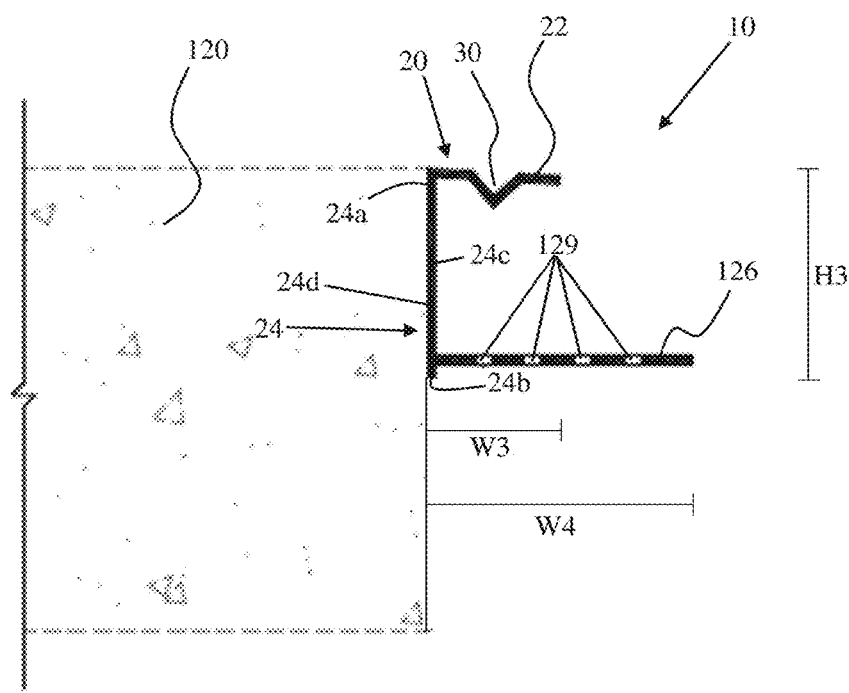
FIG. 6B is a side elevation view of the landscape border device illustrated in FIG. 6A.
Figure 6C:
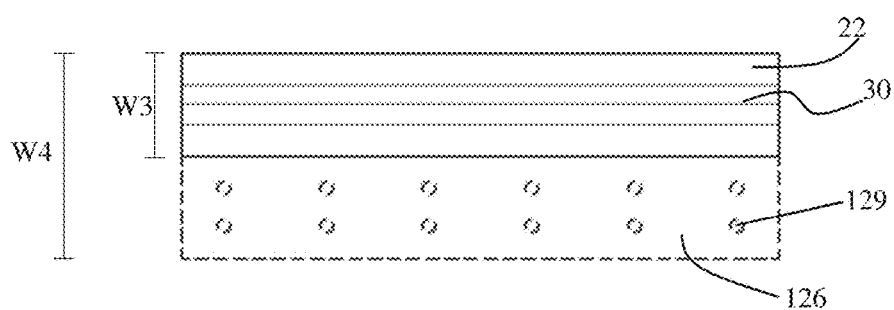
FIG. 6C is a top plan view of the landscape border device illustrated in FIGS. 6A and 6B.

With reference now to FIGS. 6A through 6C, yet another embodiment of the present invention is illustrated. In this embodiment, the device 10 includes a body 20 defined by a structural surface or wall 24, a top surface or wall 22, and an intermediate or anchoring surface or wall 126. The structural wall 24 of at least one embodiment is at least substantially vertically oriented or upright, for example, when the device or insert 10 is installed properly, for example, when the device or insert is substantially buried under ground in the manner illustrated in FIG. 6A. The structural wall 24 of at least one embodiment is similar to the back wall described in the previous embodiments. Furthermore, the top wall 22 is similar to the top wall or surface 22 described in the previous embodiments, and the intermediate or anchoring wall or ledge 126 is similar to the intermediate bottom wall 26 described above.

In addition, as described above, with regard to other embodiments of the present invention, the top wall 22 of this embodiment also includes a channel 30 disposed along at least a portion of the top, exposed surface thereof. As described herein, the channel 30 may be used to receive an herbicide, chemical, grass or week killer, or other like product, whether in liquid, solid, granular, powder or other form, and which is designed to kill any grass or weeds that may have grown on top of the top wall 22. In addition, as described herein, the channel 30 may be used as a guide for any one or more weed or grass trimming tools, whether powered or manually operated, such as a weed trimmer, roller trimmer, scissors, etc.

Moreover, the generally vertical or at least partially upright structural wall 24 of at least one embodiment includes a top end 24a, bottom end 24b, front surface 24c and rear surface 24d. As shown, the top wall 22 of at least one embodiment extends outwardly from the top end 24a of the structural wall 24. More specifically, the top wall 22 of at least one embodiment extends outwardly from the top end 24a and front surface 24c of the structural wall 24 and include a front edge 21A positioned toward the lawn or grass. When installed, the structural wall 24 is substantially or completely submerged underground, while the top surface of the top wall 22 will be exposed.

In any event, as illustrated in FIGS. 6A through 6C, in at least one embodiment, the device 10 includes an anchor ledge 126 that extends outwardly in at least one direction from the structural wall 24. In the embodiment illustrated in FIGS. 6A through 6C, the anchor ledge 126 extends outwardly from a front surface 24c of the structural wall 24 in the same direction as the top wall 22. In this regard, the anchor ledge or wall 126 is disposed beneath the top wall 22, and thus, when the device 10 is installed, the anchor ledge 126 will be submerged completely underground. Furthermore, in at least one embodiment, as shown in FIGS. 6A through 6C, the anchor ledge edge 126 extends from the structural wall 24 at or near the bottom end 24, thereof. Specifically, the anchor ledge 126 in the embodiment illustrated in FIGS. 6A through 6C extends out from the structural wall 24 proximate to the end 24b, such as at or about ¼ of an inch or ⅛ of an inch therefrom, although other distances are contemplated. In some cases, the ledge 126 can extend directly from the end 24b.

It should be noted that the embodiment illustrated in FIG. 6A through 6C can be used for installing the device 10 in existing landscapes or otherwise after the concrete (or other border 120) has already been poured, and in many cases, even after the lawn or sod 100, or a substantial amount of the lawn or sod 100 has already been installed. In this manner, the structural wall 24 may include a height of approximately 1.5 inches, although other dimensions are certainly contemplated. This will allow the user or installer to simply peel back or dig up a small portion of the grass or sod 100 and install the device 10 as shown.

Figure 7A:
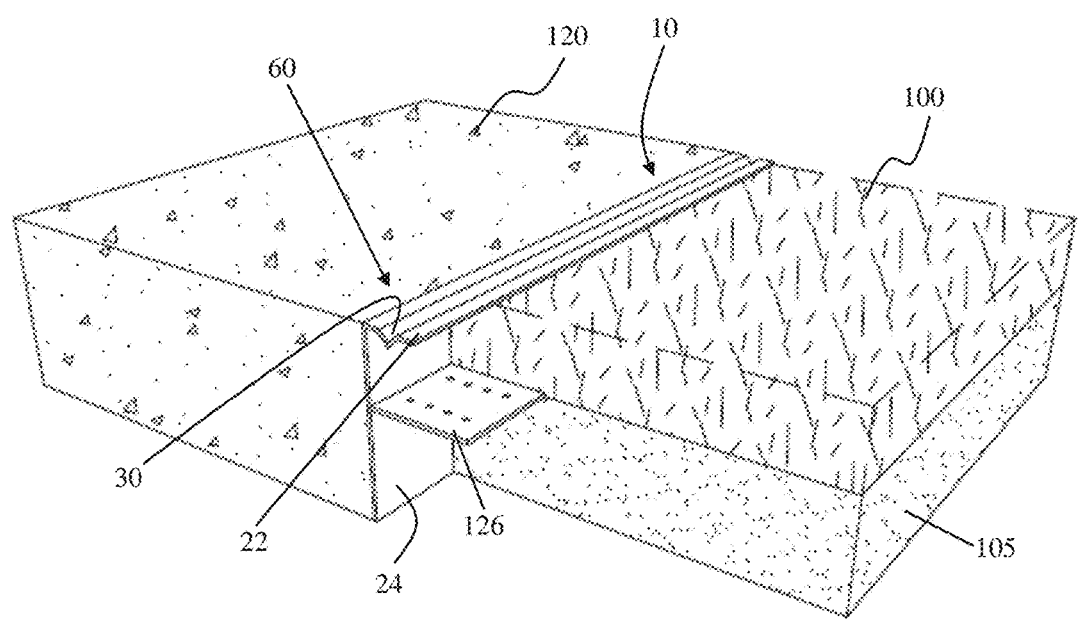
FIG. 7A is a partial cut-away perspective view of the landscape border device as disclosed in accordance with another embodiment of the present invention.
Figure 7B:
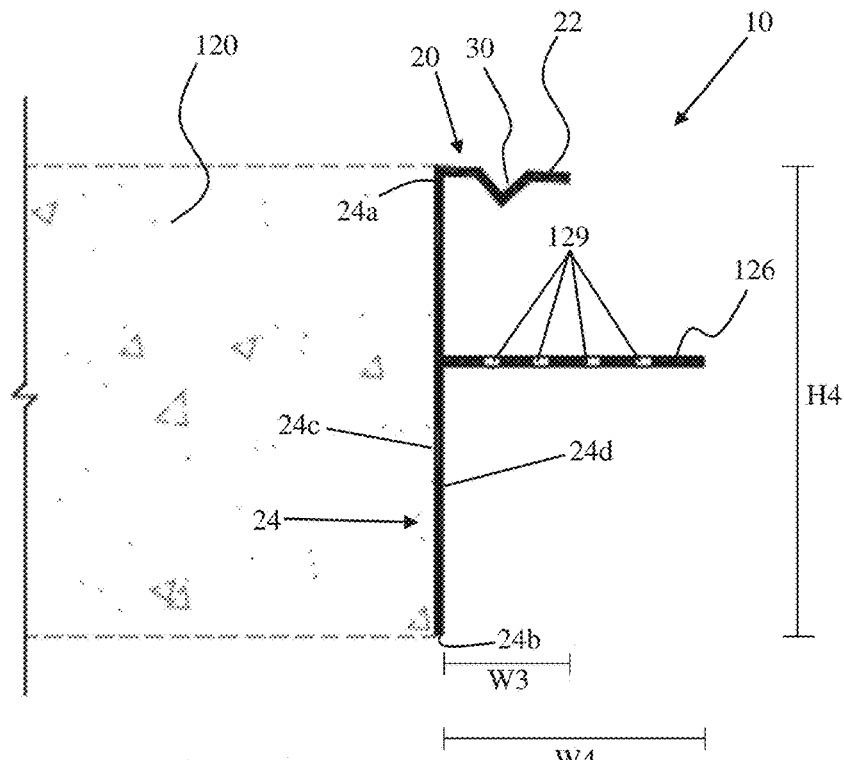
FIG. 7B is a side elevation view of the landscape border device illustrated in FIG. 7A.
Figure 7C:
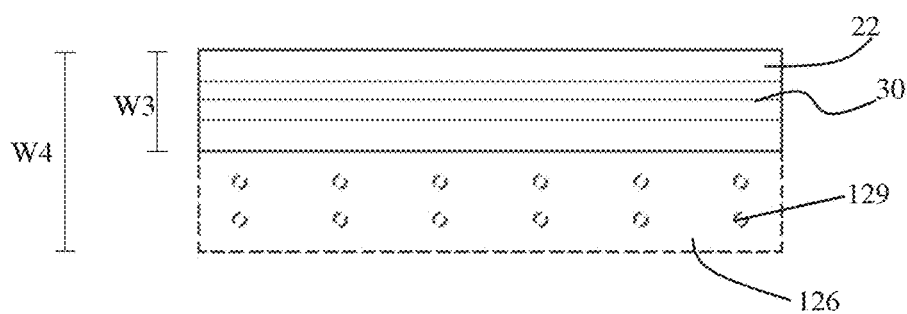
FIG. 7C is a top plan view of the landscape border device illustrated in FIGS. 7A and 7B.

In other embodiments, however, as illustrated in FIGS. 7A through 7C, the anchor ledge or wall 126 may extend outward from the structural wall 24 substantially between the top end 24a and the bottom end 24b thereof. For example, in such an embodiment, the structural wall 24 of at least one embodiment will extend substantially further downward underground than the anchor wall 126. The embodiment illustrated in FIGS. 7A through 7C can be used for new constructions. For example, the device 10 can be installed prior to pouring the adjacent concrete 120, and, in some cases, the structural wall 24 may act as a barrier or border to the concrete as it is being poured, although it does not necessarily need to, of course.

In such a case, the structural wall 24 of at least one exemplary embodiment may include a height H4 of approximately 3.5 inches measured between the top end 24a and bottom end 24b. The anchor ledge 126 may extend outward from the structural wall 24 at approximately 1.5 inches from the top end 24a and approximately 2.0 inches from the bottom end 24b. The bottom or lowest point of the channel 30 may be approximately 1⅛ inches from the top surface of the anchor ledge 126. Of course, these measurements and distances are merely exemplary, meaning that other measurements and dimensions are contemplated herein.

In any event, with reference to FIGS. 6B and 7B, for example, in at least one embodiment, the anchor ledge or wall 126 extends outward further than the top wall 22. Specifically, as illustrated in FIGS. 6B and 7B, the top wall 22 extends outward from the structural wall 24 a distance W3, whereas the anchor ledge 126 extends outward from the structural wall 24 a distance W4, where W4 is greater than W3. As just an example, W3 may be approximately equal to one (1) inch, whereas W4 may be approximately equal to two (2) inches. In this example, the anchor ledge 126 extends outwardly from the structural wall 24 a distance of about twice as far than the top wall 22. Of course, these measurements and distances are exemplary and should not be considered limiting, since other distances and measurements are contemplated within the full spirit and scope of the present invention.

Moreover, similar to the intermediate wall 26 described above, the anchor ledge or wall 126 illustrated in FIGS. 6A through 7C, includes a plurality of holes, referenced as 129, disposed therethrough. Accordingly, when the device 10 is installed within the ground, as contemplated herein and as illustrated in FIGS. 6A and 7A, for example, grass roots or other plant roots may grow through at least some of the holes 129 in the anchor ledge or wall 126. This can be used to facilitate anchoring of the device to or within the ground. For instance, since the device 10 is placed against or adjacent grass or lawn, the holes 129 disposed in the anchor ledge or wall 126 may facilitate the grass or lawn adjacent the device 10 to grow roots there through.

With reference now to FIGS. 8A through 9C, additional embodiments of the device 10 of the present invention are illustrated. In these embodiments, a lip or upper lip 226 is illustrated as extending rearward from the structural wall 24. In particular, as illustrated, the lip 226, of at least one embodiment, extends from the at least one structural wall 24 in one direction, whereas the top wall 22 extends from the at least one structural wall 24 in a different direction. In the embodiments shown, the two directions are opposite one another such that the lip 226 extends rearwardly from the top end 24a of the structural wall 24, opposite the top wall 22, which extends forwardly from the top end 24a of the top wall 24.

Figure 8A:
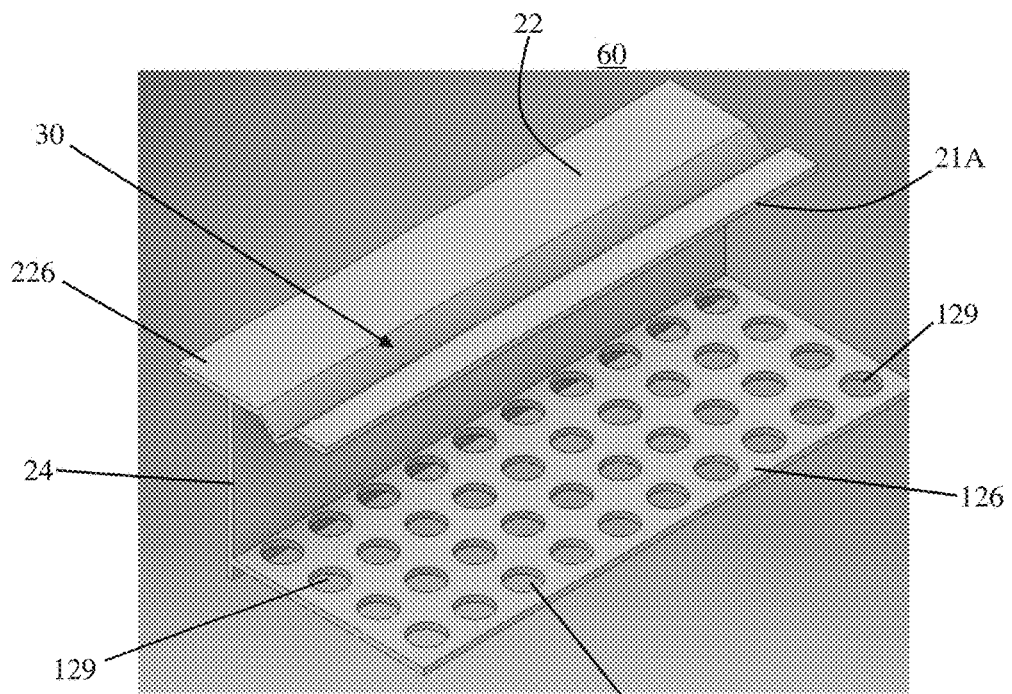
FIG. 8A is a perspective view of yet another embodiment of the landscape border as disclosed herein.

It should be noted that, as illustrated in FIG. 8A, for example, the lip 226 and the top wall 22 may define a single continuous surface, whereas the portion extending forward of the structural wall 24 is referred to as the top wall 22, and the portion extending rearward of the structural wall 24 is referred to as the anchor ledge 226.

Figure 9A:
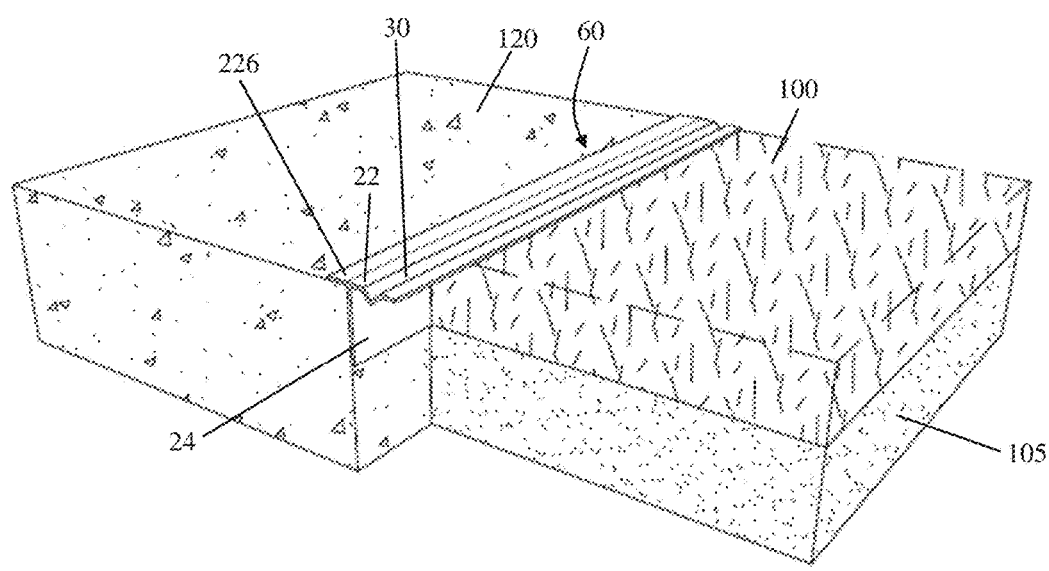
FIG. 9A is a partial cut-away perspective view of the landscape border device as disclosed in accordance with another embodiment of the present invention.
Figure 9B:
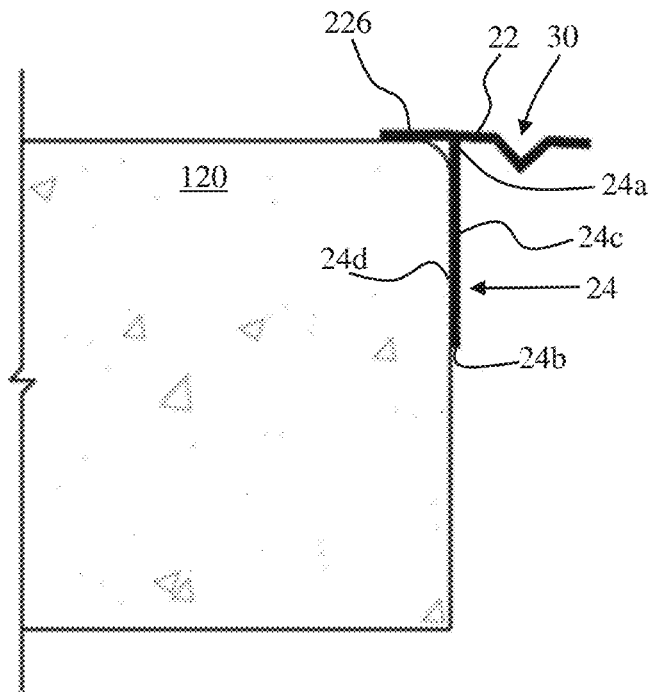
FIG. 9B is a side elevation view of the landscape border device illustrated in FIG. 9A.

In particular, as shown in FIGS. 9A and 9B, the lip 226 of at least one embodiment is structured to at least partially extend over a portion of the adjacent surface 120 (e.g., concrete, asphalt, brick, etc.) Accordingly, the lip 226 can create a clean transition between the device 10 and the adjacent surface 120. In some cases, the lip 226 can also provide some additional stability in the device 10 when installed. For example, with the lip 226 extending over a portion of the adjacent surface 120, the device 10 may be more stable via the contact points between the lip 226 and the surface 120.

Figure 8B:
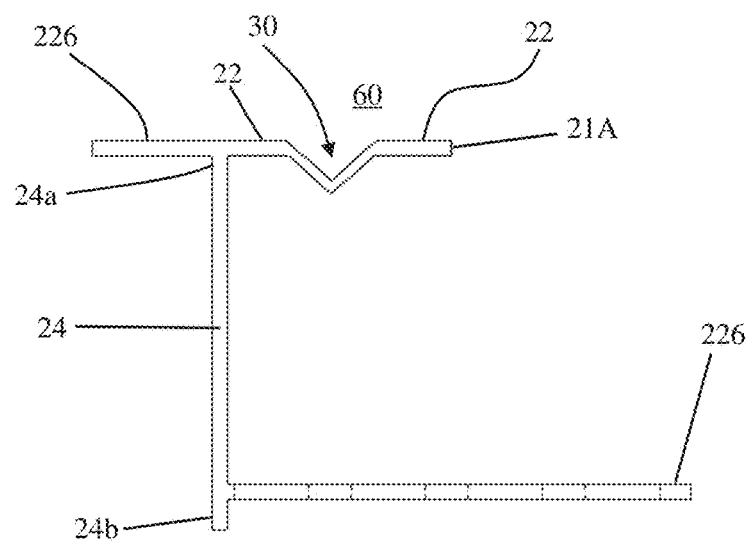
FIG. 8B is a side elevation view of the landscape border illustrated in FIG. 8A.

It should also be noted that, in some embodiments, as illustrated in FIGS. 8A and 8B, the device may include both the lip 226 and the anchor ledge 226, as describer herein. Although, as shown in FIGS. 9A, 9B and 9C, the device 10 of at least one embodiment may include the lip 226 while the anchor ledge 126 is not included.

Figure 9C:
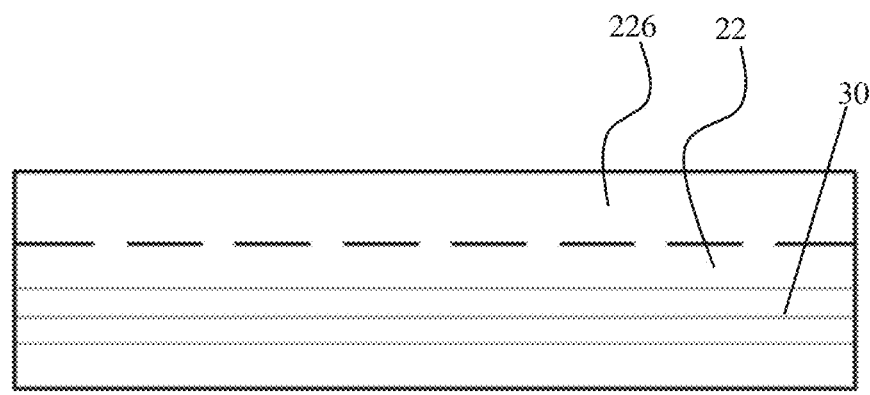
FIG. 9C is a top plan view of the landscape border device illustrated in FIGS. 9A and 9B.

Moreover, in some cases, particularly, but not limited to the embodiment illustrated in FIGS. 9A, 9B and 9C, an adhesive, such as liquid nails, or other attachment devices such as screws, nails, boles, etc. may be used to secure the device 10 to the adjacent surface 120. For example, an adhesive may be disposed under the lip 226 or in the corner between the lip 226 and the structural wall 24. In some cases, anchors, screws, nails, bolts, etc. may be secured through the lip 226 or through the structural wall 24 an into the adjacent surface 120.

Figure 10A:
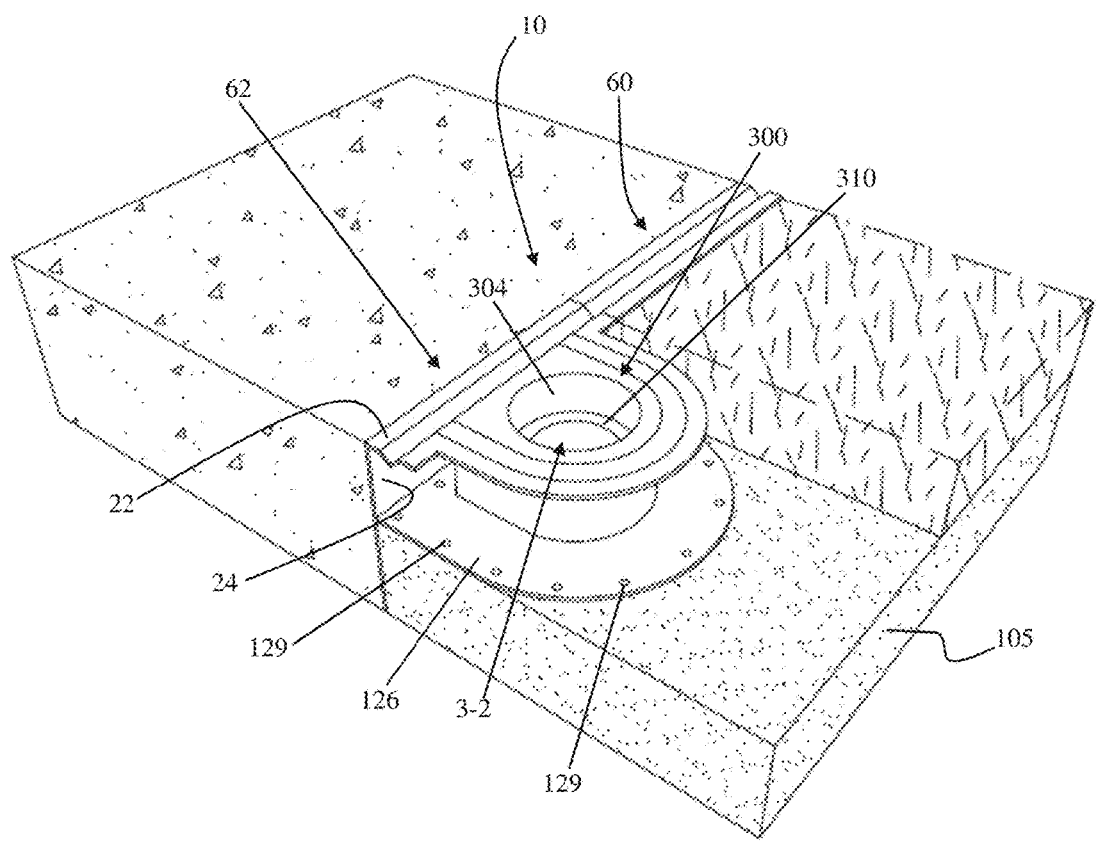
FIG. 10A is a partial cut-away perspective view of the landscape border assembly as disclosed in accordance with at least one embodiment of the present invention.
Figure 10B:
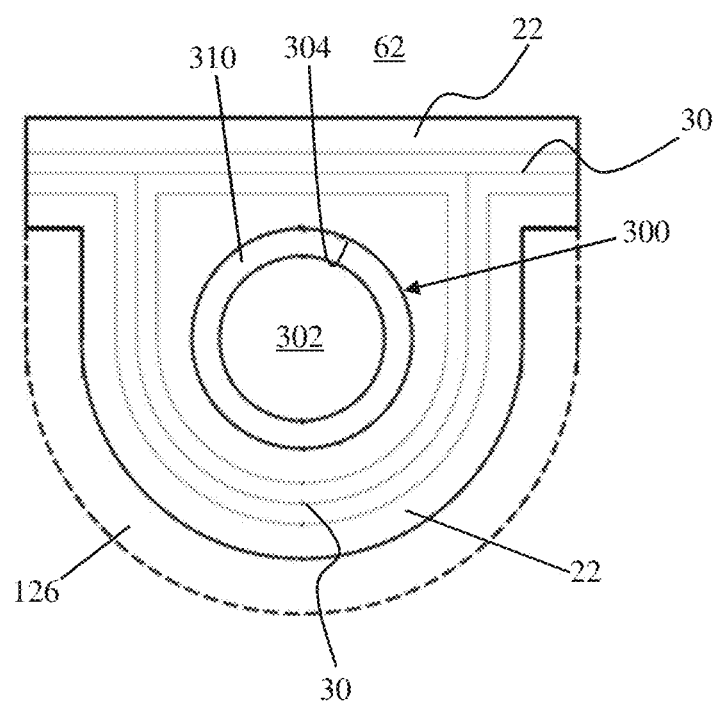
FIG. 10B is a top plan view of at least one landscape border device as disclosed in accordance with at least one embodiment of the present invention.

With reference now to FIGS. 10A and 10B, the system, assembly or device 10 includes a piece or portion 62 that includes an auxiliary support assembly, generally referenced as 300. For example, as best shown in FIG. 10A, the system 10 of at least one embodiment can include a plurality of pieces or sections 60, 62 disposed or positioned at an end-to-end relation to one another to collectively create a border around a lawn or landscape. For instance, the system 10 may include at least one piece 60 (e.g., which may be similar to any of the pieces referenced in FIGS. 6A through 9B) and at least one additional piece 62 (referenced and described in FIGS. 10A through 10B).

Figure 11A:
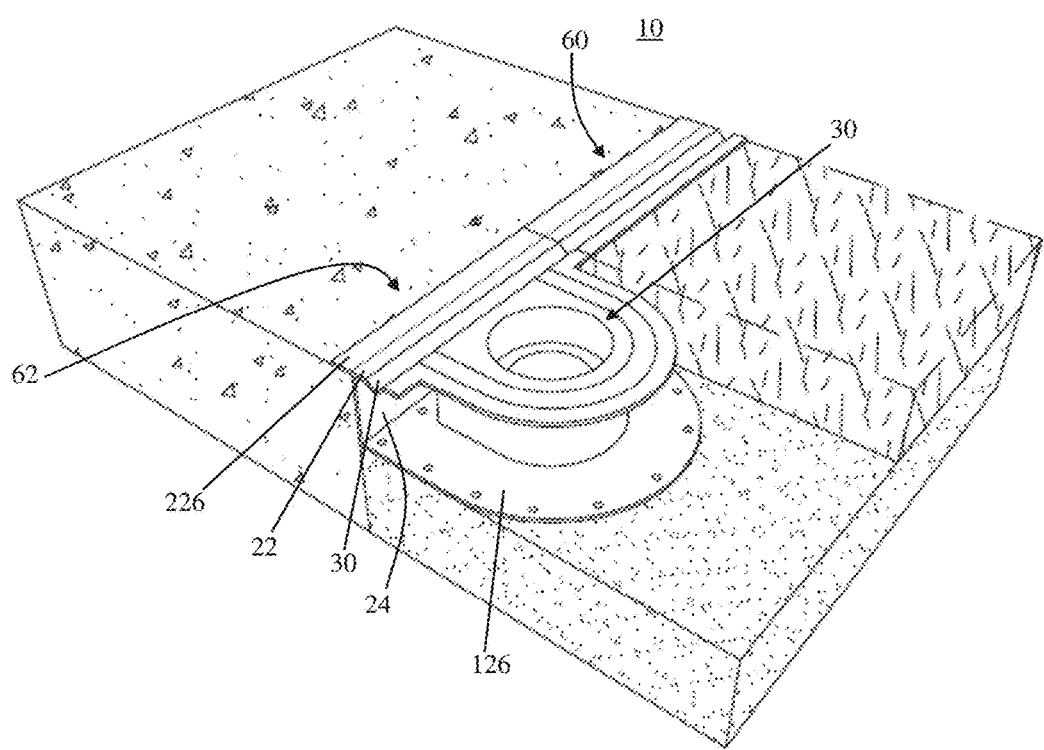
FIG. 11A is a partial cut-away perspective view of the landscape border assembly as disclosed in accordance with another embodiment of the present invention.
Figure 11B:
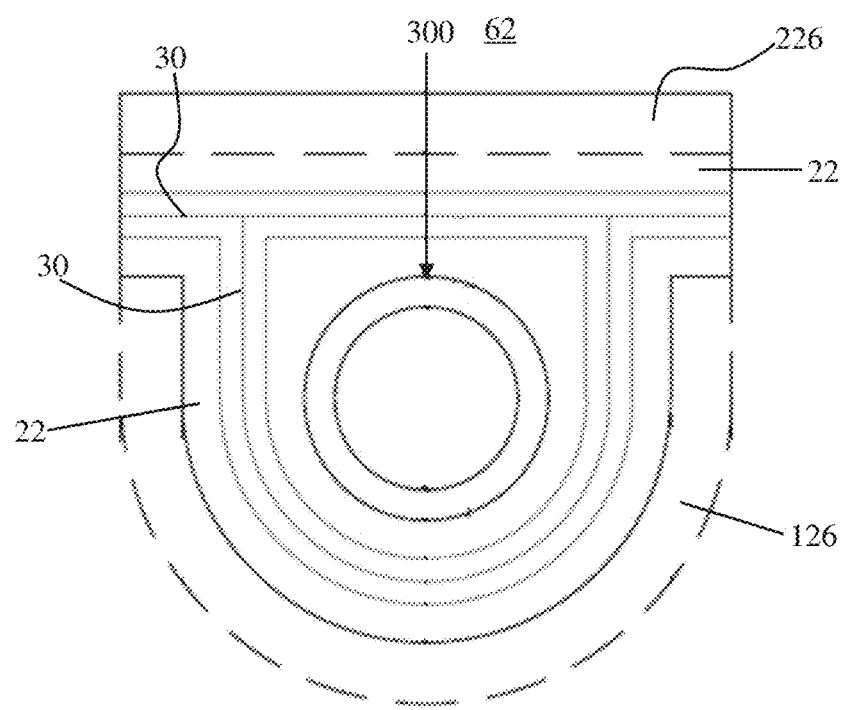
FIG. 11B is a top plan view of at least one landscape border device as disclosed in accordance with another embodiment of the present invention.
Figure 12:
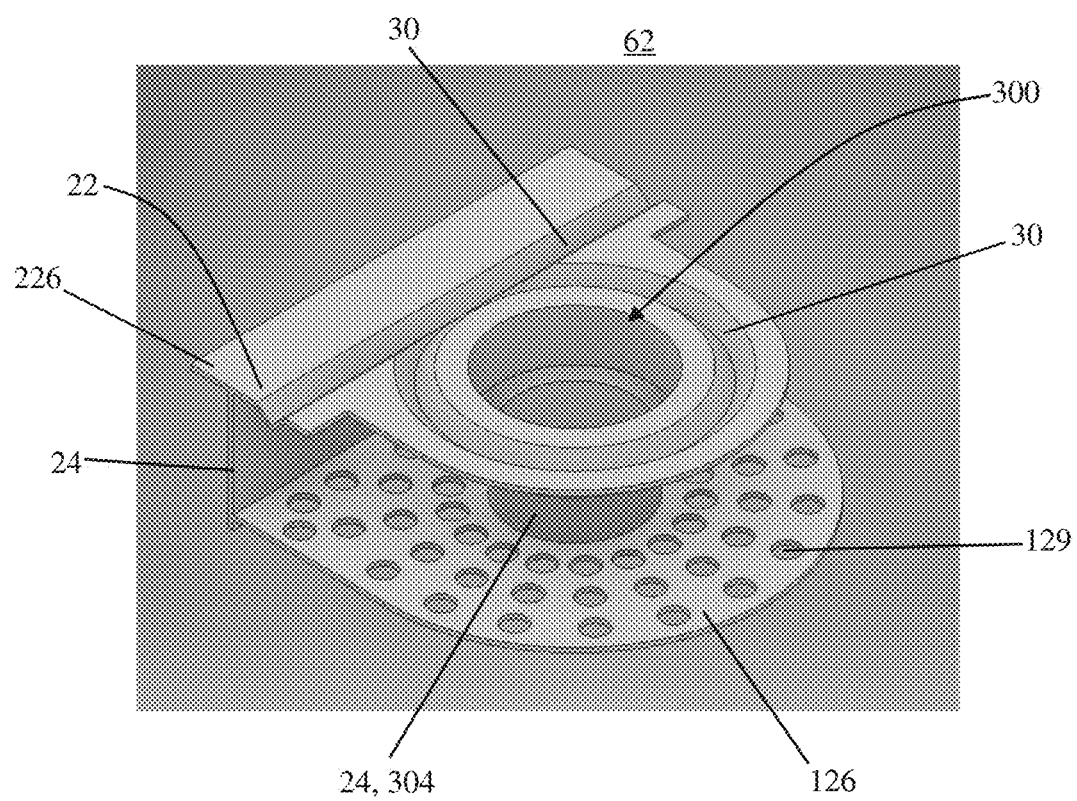
FIG. 12 is a perspective view of at least one landscape border device as disclosed in accordance with another embodiment of the present invention.
Figure 13:
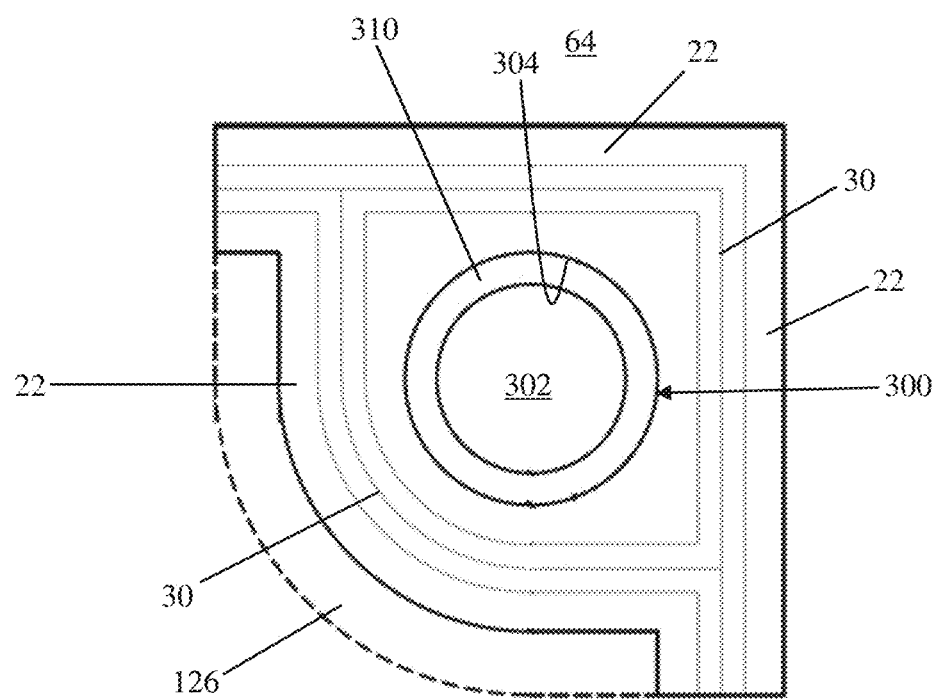
FIG. 13 is a top view of at least one landscape border device as disclosed in accordance with another embodiment of the present invention.
Figure 14:
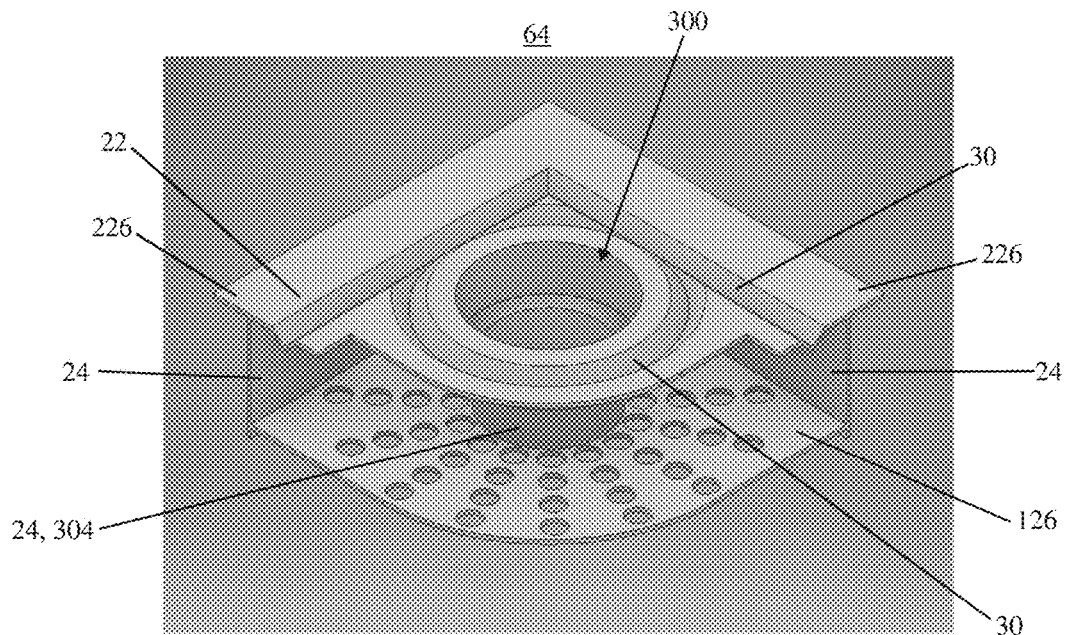
FIG. 14 is a perspective view of at least one landscape border device as disclosed in accordance with another embodiment of the present invention.
Figure 15:
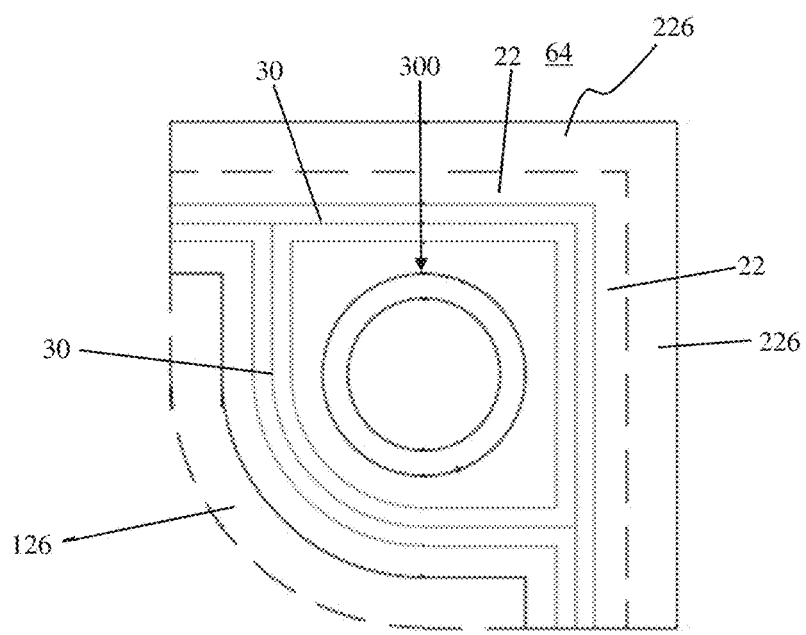
FIG. 15 is a top view of at least one landscape border device as disclosed in accordance with another embodiment of the present invention.

FIGS. 11A-11B and 12 represent additional embodiments of section 62 that includes an auxiliary support assembly 300. In addition, FIGS. 13, 14, and 15 illustrate different embodiments of a corner piece or angled piece 64, also with an auxiliary support assembly 300, as described herein. Specifically, each of these pieces or sections 60, 62, 64 can be placed together in an end-to-end relation to one another to form a collective border system or assembly 10 of at least one embodiment of the present invention. It should be noted that virtually any combination of pieces or sections 60, 62, 64 can be placed together, as desired or as dictated by the particular installation site. For instance, multiple straight pieces or sections 60 can be connected or placed end-to-end, followed by a single module piece 62 or a corner piece 64.

It should also be noted that, in some embodiments, the plurality of pieces or sections 60, 62, 64 may simply abut against one another in an end-to-end relation, while, in other embodiments, the pieces or sections 60, 62, 64 may connect or engage one another via one or more clips, snaps, or mating edges, for example.

In any event, the auxiliary support assembly 300 of certain embodiments of the present invention is structured and configured to receive, support or otherwise house an auxiliary module therein. In some embodiments the auxiliary module may be fixedly secured to the device 10, such that it is not removable or replaceable, while in other embodiments, the auxiliary module maybe selectively installed, removed, and in some case, interchanged with other auxiliary modules, as desired.

In particular, an auxiliary module may include, for example, a sprinkler assembly or sprinkler head (e.g., a pop-up sprinkler head) or a light assembly or light module. In some embodiments, the auxiliary support assembly 300 may be configured to receive one or more auxiliary modules commonly bought or found at a store, such as a hardware store. However, in other embodiments, the auxiliary module may be specifically designed, shaped and constructed to fit within the auxiliary support assembly 300 described herein.

For instance, the auxiliary support assembly 300 of at least one embodiment is defined as including a hole 302 extending at least through the top wall 22. The hole 302 defines a vertical channel, for example, via one or more surrounding support walls 304. A ledge 310 may be disposed within the vertical or auxiliary channel for receiving or supporting an auxiliary module therein or thereon.

In at least one embodiment, as illustrated in FIG. 10A, for example, the vertical or auxiliary channel 302 of the auxiliary support assembly 300 may also extend through the anchor ledge 126. In this manner, the bottom end of the vertical or auxiliary channel 302 may extend to the soil 105 beneath the anchor ledge 126, as illustrated in FIG. 10A. With the auxiliary module (e.g., sprinkler head, light module, etc.) installed within the channel 302, any necessary hookup pipes, cables, wires, etc. can be installed or routed beneath the anchor ledge 126 within the surrounding soil 105 or ground.

With reference to FIGS. 10A and 10B, the embodiment shown includes a section or portion 62 with an auxiliary support assembly 300 and an anchor ledge 126 that extends out beyond the top wall 22, as described in accordance with other embodiments herein. The channel 30 disposed on the top wall 22 extends along the straight portion of the top wall 22, as shown, as well as at least partially around the auxiliary support assembly 300, for example, following the curvature of the front edge 21A. Furthermore, two structural walls are illustrated in in this example, as at 24 and 304. One of the structural walls 24 abuts against the adjacent surface 120, while the other structural wall 304 surrounds the channel 302 of the auxiliary support assembly 300.

FIGS. 11A and 11B illustrate a similar embodiment as that illustrated in FIGS. 10A and 10B, with a lip 226 added that id disposable in an at least partially overlying relation to the adjacent surface 120, as shown and as described herein.

FIG. 12 illustrates a similar embodiment as that shown in FIGS. 11A and 11B, although with a different pattern of holes on the anchor ledge 126. In addition, the channel 30 on the top of the top wall 22 has a slightly different pattern or curvature.

With reference to FIGS. 13, 14, and 15, a plurality of corner pieces 64 are illustrated. In particular, FIG. 13 illustrates a corner piece 64 with no lip, although it does include an anchor ledge 126, auxiliary support assembly 300, and channel 30 as disclosed and described in accordance with other embodiments herein.

FIGS. 14 and 15 illustrate different views and embodiments of the corner piece 64 with a lip 226 as disclosed herein.

Figure 16A:
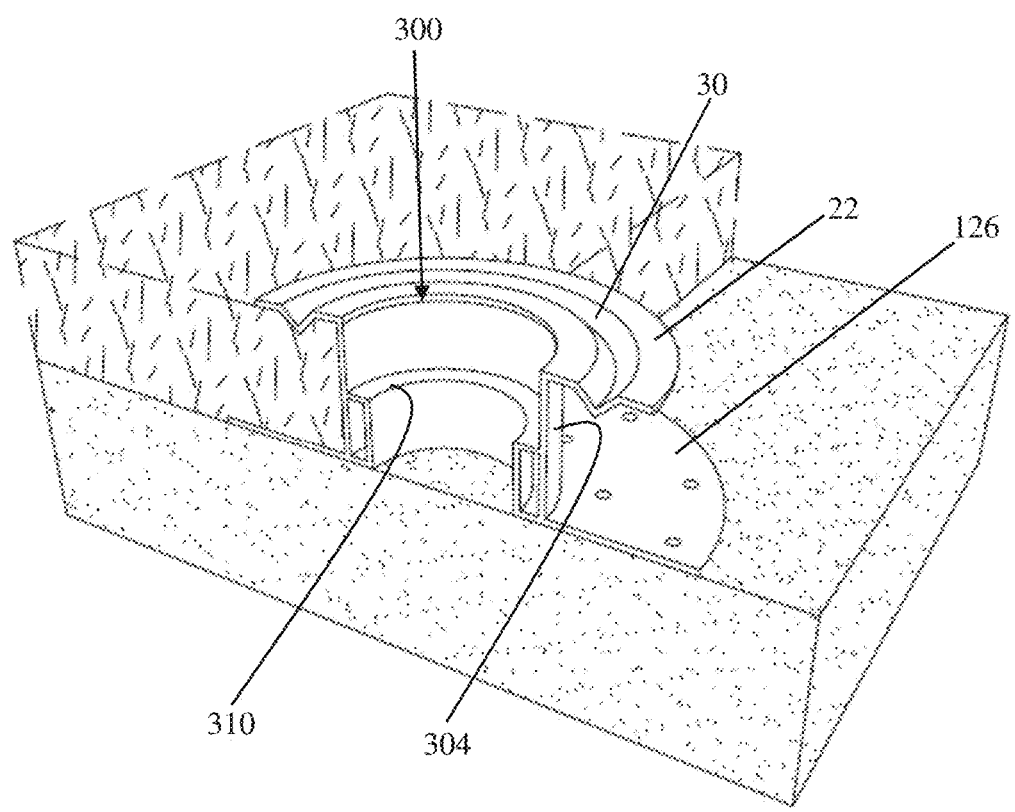
FIG. 16A is a cut-away perspective view of a stand-alone or free-standing piece of the landscape border assembly as disclosed in accordance with at least one embodiment of the present invention.
Figure 16B:
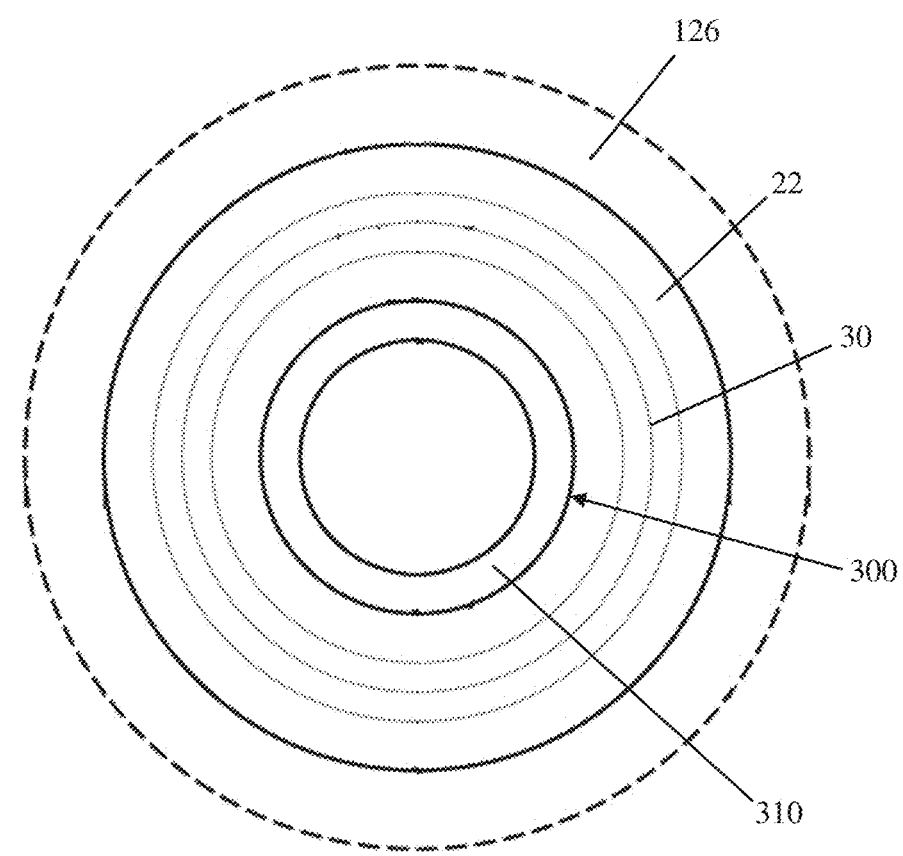
FIG. 16B is a top plan view of the stand-alone piece illustrated in FIG. 18A.
Figure 17:
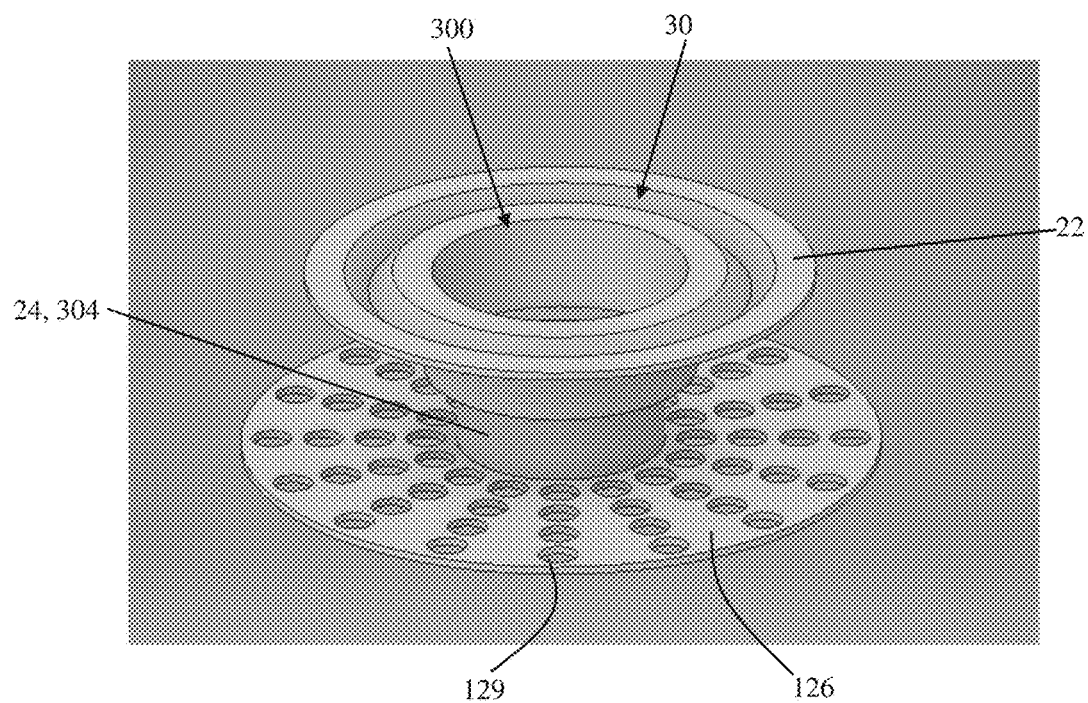
FIG. 17 is a perspective view of a stand-alone or free-standing piece of the landscape border assembly as disclosed in accordance with at least one embodiment of the present invention.

FIGS. 16A, 16B and 17 illustrate yet another embodiment of the present invention. In this embodiment, the device 10 is referred to as a free-standing piece in that it can be installed within the confines of the lawn or landscape to create a border therein, instead of against an adjacent surface 120, such as concrete or brick. Specifically, in this embodiment, the device 10 includes an auxiliary module support assembly 300 defined by a support wall 304 and ledge 310. The top wall 22 extends radially outward from a top end of the support wall 304, while the anchor ledge 126 extends radially outward from the support wall 304 beneath the top wall 22. As should be apparent, the device 10 illustrated in FIGS. 16A, 16B, and 17 can be placed almost anywhere within the lawn or landscape to house or retain an auxiliary module, such as a sprinkler head or light fixture, and to create a border within the confines of the lawn or landscape.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described,

What is claimed is:

1. A landscape border comprising:
   at least one structural wall, a top wall, and at least one anchor ledge,
   said at least one structural wall comprising a top end, a bottom end, a front surface, and a rear surface,
   said top wall extending radially outward from said top end of said at least one structural wall, said top wall comprising a front edge disposable along a lawn,
   said at least one anchor ledge extending radially outwardly in at least one direction from said structural wall beneath said top wall, said at least one anchor ledge comprising a plurality of holes disposed therethrough, wherein said at least one anchor ledge and at least a substantial portion of said at least one structural wall are adapted to be buried underground while a top surface of said top wall is exposed above ground,
   a vertically-oriented inner channel extending between said top wall and said anchor ledge, said vertically-oriented inner channel being at least partially defined by said rear surface of said at least one structural wall, and
   wherein said vertically-oriented inner channel comprises an open top end at said top wall and an open bottom end.

2. The landscape border as recited in claim 1 further comprising a surface channel disposed along at least a portion of said top surface of said top wall.

3. The landscape border as recited in claim 2 wherein said surface channel is disposed between said front edge of said top wall and said at least one structural wall.

4. The landscape border as recited in claim 2 wherein said at least one surface channel is continuously disposed along a length of said top wall.

5. The landscape border as recited in claim 2 wherein said at least one surface channel comprises a v-shaped configuration.

6. The landscape border as recited in claim 1 wherein said at least one anchor ledge comprises an outer edge, wherein said outer edge of said anchor ledge is concentric with said front edge of said top wall.

7. The landscape border as recited in claim 1 wherein said at least one anchor ledge extends outwardly from said front surface of said at least one structural wall between said top end and said bottom end of said structural wall.

8. The landscape border as recited in claim 1 wherein said at least one anchor ledge comprises an outer end that extends from said at least one structural wall beyond said front edge of said top wall.

9. A landscape border comprising:
   at least one structural wall and a top wall,
   said at least one structural wall comprising a circular configuration and defining a center channel therein,
   said at least one structural wall comprising a top end, a bottom end, a front surface, and a rear surface,
   said top wall extending outwardly from said top end of said at least one structural wall toward a front edge disposable along a lawn, said front edge comprising a continuous, circular configuration at least one anchor ledge extending outwardly from said structural wall beneath said top wall, said at least one anchor ledge comprising a plurality of holes disposed therethrough, and wherein said center channel defines a continuous opening disposed entirely through said landscape border.

10. The landscape border as recited in claim 9 wherein said anchor ledge comprises an outer end that extends beyond said front edge of said top wall.

11. The landscape border as recited in claim 9 further comprising a support ledge disposed within said vertically-oriented channel.

12. The landscape border as recited in claim 11 wherein said support ledge extends inward from rear surface of said at least one structural wall.

13. The landscape border as recited in claim 9 further comprising a surface channel disposed between said front edge of said top wall and said at least one structural wall.

14. The landscape border as recited in claim 13 wherein said surface channel comprises a depth greater than a thickness of said top wall, wherein a bottom end of said surface channel extends below a bottom surface of said top wall.

15. The landscape border as recited in claim 3 wherein said surface channel comprises a depth greater than a thickness of said top wall.

16. The landscape border as recited in claim 3 wherein a bottom end of said surface channel extends below a bottom surface of said top wall.

* * * * *